(12) United States Patent
Maier et al.

(10) Patent No.: US 12,671,103 B2
(45) Date of Patent: Jun. 30, 2026

(54) APPARATUS AND METHOD FOR INSTALLING AN ELECTROCHEMICAL CELL STACK

(71) Applicants: Robert Bosch GmbH, Stuttgart (DE); Powercell Sweden AB, Gothenburg (SE)

(72) Inventors: Eberhard Maier, Koengen (DE); Johan Flink, Gothenburg (SE); Stefan Munthe, Gothenburg (SE)

(73) Assignees: Robert Bosch GmbH, Stuttgart (DE); Powercell Sweden AB, Gothenburg (SE)

( * ) Notice: Subject to any disclaimer, the term of this patent is extended or adjusted under 35 U.S.C. 154(b) by 603 days.

(21) Appl. No.: 17/800,597

(22) PCT Filed: Jan. 27, 2021

(86) PCT No.: PCT/EP2021/051806
§ 371 (c)(1),
(2) Date: Aug. 18, 2022

(87) PCT Pub. No.: WO2021/164999
PCT Pub. Date: Aug. 26, 2021

(65) Prior Publication Data
US 2023/0343981 A1 Oct. 26, 2023

(30) Foreign Application Priority Data
Feb. 19, 2020 (DE) ..................... 10 2020 202 058.2

(51) Int. Cl.
*H01M 8/2404* (2016.01)

(52) U.S. Cl.
CPC ................................. *H01M 8/2404* (2016.02)

(58) Field of Classification Search
CPC .................................................... H01M 8/2404
See application file for complete search history.

(56) References Cited

U.S. PATENT DOCUMENTS

2017/0207477 A1* 7/2017 Heinzmann ........... H01M 8/248

FOREIGN PATENT DOCUMENTS

CN 101228658 A 7/2008
CN 106981676 A 7/2017
(Continued)

OTHER PUBLICATIONS

JP3918375B2 machine translation (Year: 2025).*
Translation of International Search Report for Application No. PCT/EP2021/051806 dated May 3, 2021 (3 pages).

*Primary Examiner* — Brian R Ohara
*Assistant Examiner* — M. T. Leonard
(74) *Attorney, Agent, or Firm* — Michael Best & Friedrich LLP

(57) ABSTRACT

A method for assembling an electrochemical cell stack is proposed, which has the following steps:

assembling a first stack component (140), which has a first adjustment opening (115), on an electrochemical sub-stack through cooperation between the first adjustment opening (115) and a first adjustment device (110). Repositioning the first adjustment device (110) in the construction direction of the electrochemical substack for locally adjusted assembly of a second stack component, which has a corresponding first adjustment opening for locally adjusted assembly.

9 Claims, 1 Drawing Sheet

(56)     References Cited

FOREIGN PATENT DOCUMENTS

| | | | |
|---|---|---|---|
| CN | 109103486 | A | 12/2018 |
| DE | 102017100362 | A1 | 7/2017 |
| DE | 102016004306 | A1 | 10/2017 |
| DE | 112005002126 | B4 | 5/2018 |
| DE | 102017108413 | A1 | 10/2018 |
| EP | 1685615 | B1 | 11/2011 |
| JP | 2003086232 | A | 3/2003 |
| JP | 3918375 | B2 * | 5/2007 |
| JP | 2007287436 | A | 11/2007 |
| KR | 20150059542 | A | 6/2015 |

* cited by examiner

APPARATUS AND METHOD FOR INSTALLING AN ELECTROCHEMICAL CELL STACK

BACKGROUND OF THE INVENTION

Electrochemical devices which are based on electrochemical cell stacks can comprise electrochemical cells for converting electric energy into chemical energy or for converting chemical energy into electric energy. Examples of electrochemical devices are polymer electrolyte membrane (PEM) fuel cells, solid oxide fuel cells (SOFC), high-temperature or low-temperature fuel cells in general and electrolyzers or redox flow batteries.

Fuel cells or batteries as examples of electrochemical devices are typically used as electric current sources for supplying power to electric motors or machines or for stationary decentralized energy systems. In this case, electric drives are increasingly part of a vehicle drive for electric bicycles, electric cars, hybrid vehicles and so on. Such systems promise an efficient energy supply and have environmental benefits.

Fuel cells convert chemical reaction partners, namely fuels and oxidants, into reaction products via electrode reactions, wherein electric energy is provided. Fuel cells generally use an electrolyte, which is arranged between two electrodes, namely a cathode and an anode. A catalyst typically promotes or ensures the desired electrochemical reactions at the electrodes.

An electrochemical cell can contain a proton exchange membrane (PEM), which represents a base for a membrane-electrode arrangement (MEA). Such a membrane-electrode arrangement is formed by a membrane which is coated with a catalyst on both sides and is arranged between a pair of gas diffusion layers.

Since individual fuel cells generate little energy and only a small voltage (e.g. approximately 0.7-0.9 volts), a plurality of fuel cells or electrochemical cells can be arranged together in a stack in order to generate sufficient electric energy to operate motor vehicles or sufficient fuel, for example.

The construction of such a stack requires a huge number of repeating stack components to create such a whole stack of bipolar plates and membrane-electrode units, for example. Tolerances in the dimensions of the stack components may accumulate and thereby result in irregularly formed stacks.

SUMMARY OF THE INVENTION

Such an irregularly formed cell stack is produced in particular if successive stack components, such as bipolar plates with a membrane-electrode unit arranged between them, are not sufficiently well aligned. Attempts are frequently made to align the various stack components, such as bipolar plates and membrane-electrode units, using external alignment elements. Due to the considerable manufacturing tolerances of the bipolar plates and especially the flexible and unstable membrane-electrode units, such alignment elements, which are arranged on the outside of such a stack, must have a sufficient spacing from the stack components to prevent jamming. This large spacing results in the stack components assuming an unfavorable position, in particular when manufacturing tolerances result in small dimensions of the stack components and they are positioned against the outer alignment elements in an alternating manner.

It should additionally be noted that, for electrical insulation of adjacent bipolar plates, the unstable membrane-electrode unit must terminate at an edge of the bipolar plates or have a protruding length, whereby manufacturing tolerances which are present in the individual stack components may have a greater effect.

Aspects of the present invention relate to a method for assembling an electrochemical cell stack, a device for assembling stack components and the use of the device according to the features of the independent claims. Advantageous configurations are the subject matter of the dependent claims and the description below.

The invention is based on the realization that repositioning at least one adjustment device in a corresponding adjustment opening of a stack component improves the precision when assembling the stack components one above another in a locally adjusted manner, in particular if the adjustment device is designed to position only an upper portion of the stack components.

It should be pointed out that the features and measures listed individually in the description below may be combined with one another in any technically reasonable manner and demonstrate further configurations of the invention. The description additionally characterizes and specifies the invention in particular in conjunction with the figures.

According to one aspect, a method for assembling an electrochemical cell stack is proposed. In a first step of this method, a first stack component, which has a first adjustment opening, is assembled on an electrochemical substack through cooperation between the first adjustment opening and a first adjustment device. In a further step, the first adjustment device is refilled in the construction direction of the electrochemical substack for locally adjusted assembly of a second stack component, wherein the second stack component has a corresponding first adjustment opening for locally adjusted assembly.

Such an electrochemical cell stack can be used to convert electric energy into chemical energy or chemical energy into electric energy. A fuel cell, a redox flow cell or an electrolyte cell are examples of such a conversion process.

The electrochemical cells, which are arranged in a stacked manner next to one another, can have, between their cathode plate and the anode plate, a membrane-electrode arrangement on which the actual electrochemical reaction proceeds.

By way of example, such an electrochemical cell stack can be used to construct a fuel cell stack. The plurality of electrochemical cells, which are arranged next to one another in layers, may comprise a small number of cells, for example two or three cells; the plurality of electrochemical cells may also comprise 100 cells, or a much higher number of electrochemical cells may be arranged in a stacked manner next to one another in order to form a fuel cell stack, for example.

When assembling or arranging stack components next to one another, these can cooperate such that irregularities—which result from the manufacture or assembly of a membrane-electrode unit or a bipolar plate, for example, and are often unavoidable—are aggregated. In this case, the repositioning of the first adjustment device in the construction direction means that, as the height of the electromechanical substack gradually increases due to the assembly of further second stack components, the first adjustment device can be arranged in each case such that the assembly of a second stack component can be carried out in an optimally adjusted manner in each case with the aid of the first adjustment device.

A stack component can comprise for example an electrochemical cell or a component of an electrochemical cell, such as a bipolar plate or a membrane-electrode unit or another component of an electrochemical cell or preassembled component of an electrochemical cell.

Consequently, a first membrane-electrode unit is advantageously firstly assembled as a stack component before a bipolar plate is assembled as a second stack component using this method. An alignment of these two stack components relative to one another enables a possible unevenness of the membrane-electrode unit due to the assembly of the subsequent bipolar plate to be straightened out with little effort.

Therefore, by means of this method, stack components are assembled in an adjusted manner, especially in the horizontal direction, even as the height of the electrochemical cell stack increases, since the adjusting device is repositioned. Such an adjustment opening can be located completely inside the stack component or it can also be partially open towards the edge of the stack component. In this case, during the locally adjusted assembly, the second stack component is adjusted substantially in relation to, or with respect to, the underlying first stack component.

The term "electrochemical cell stack" should be interpreted broadly and includes both an electrochemical substack and an electromechanical substack on which a first stack component and/or second stack component has been assembled.

The repositioning of the first and/or the second adjustment device can then take place if an adjustment region of the adjustment device is revised for adjusted assembly of a second stack component as the stack height increases.

As a result of the locally adjusted assembly of the first stack component, which has a first adjustment opening, with the aid of the first adjustment device, it is possible to prevent an offset between gas channels of one bipolar plate and a further bipolar plate, which can each represent a first stack component. It is necessary to prevent such an offset since, if an offset between the corresponding gas channels of the bipolar plates is too great and if pressure is applied to the cell stack following its assembly, a gas diffusion layer, which is arranged between the bipolar plates, is pressed into the gas channels of the bipolar plates, which can result in an irregular gas distribution. This is particularly critical if this varies from electrochemical cell to electrochemical cell and the electrochemical properties, for example the power densities, thus vary from one electrochemical cell to the next electrochemical cell.

A subgasket, which borders a membrane in each case, shall terminate flush with the adjacent bipolar plates or protrude beyond them in order to prevent possible short-circuits at the edge of the cell stack due to the differences in potential. The precise adjustment via the method described here can prevent a situation in which, due to the manufacturing tolerances, the respective dimensions have to be configured in such a way that the subgaskets, in particular in ports which are provided for supplying and discharging the process gases, protrude to an extent which results in unwanted throttling of gas flows in the ports.

In this case, a membrane-electrode unit should be interpreted broadly and contains both the membrane-electrode unit itself and a membrane-electrode unit which is bordered or framed by a subgasket or has a subgasket.

Furthermore, as a result of this method, the assembly of an electrochemical cell stack can be automated using machines or robots, since, as a result of this adjustment, cumulative deviations in the alignment of the cell stack can be reduced to the extent that the aligning effect of the respective adjustment device together with the respective adjustment opening is sufficient for automating such assembly.

According to the current prior art, the start of the cell stack is, in many cases, held in position by means of a fixed bearing, and the stack end, owing to a possible offset of the cell stack during stacking, is supported by a floating bearing, since, for functioning of the electrochemical cell stack, an end of the cell stack must not be deformed by external forces. As a result, with the positioning tolerances of the cell stack end, it is necessary to provide additional assembly space for each electrochemical cell stack. In addition, during assembly, the floating bearing needs to be displaced in a wide area and adapted to the actual position.

As a result of the first adjustment device being repositioned for assembly of a second stack component in the method proposed here, the first adjustment device can be designed to adjust, in particular locally adjust, only some of the stack components in the electrochemical substack—even if the electrochemical substack has reached a certain height of, for example, greater than 50 mm or greater than 50 electrochemical cells—without adversely affecting the thin bipolar plates or the unstable subgaskets of the membrane-electrode unit after completed assembly of the cell stack, despite the dimensions of the clearance fit between the first adjustment device and the first adjustment opening being designed with a slight play. In other words, effective alignment of the electrochemical cell stack by means of this method is restricted to a particular height range, corresponding to a local adjustment.

According to one aspect, it is proposed that a plurality of stack components are arranged between the first and the second stack component.

According to one aspect, it is proposed that the first adjustment opening and/or the second adjustment opening is arranged completely inside the first and/or the second stack component.

According to one aspect, it is proposed that the first stack component and the second stack component each have a corresponding second adjustment opening and are assembled on the electrochemical substack in a locally adjusted manner with the aid of a second adjustment device, wherein the second adjustment device is repositioned in the construction direction of the electrochemical substack for assembly of the second stack component.

In particular, the first adjustment device and the second adjustment device can be repositioned synchronously for assembly of the second stack line component.

In this case, the respective associated adjustment opening of the respective stack component cooperates with the corresponding adjustment device such that, owing to the cooperating dimensions and cooperating shape of the respective adjustment opening and the respective adjustment device, an adjusting effect for the assembly of stack components is achieved.

According to one aspect, it is proposed that the first and/or the second stack component are assembled with the aid of a total adjustment device, which is arranged outside the electrochemical substack. Since such a total adjustment device, which is arranged outside the electrochemical substack, can be designed to be mechanically rigid over the whole height of an electrochemical cell stack, it is thus possible to realize total adjustment of the electrochemical cell stack, which supports a local adjustment as brought about by the first or second adjustment device.

According to one aspect, it is proposed that, during assembly, the first and/or the second stack component is positioned via the first adjustment opening and is aligned via the second adjustment opening.

As a result of each of the stack components having a first and a second adjustment opening, which cooperate with a first and second adjustment device for adjustment purposes, the first adjustment opening can cooperate with the first adjustment device in order to position a stack component and the second adjustment opening can be designed to cooperate with a second adjustment device such that the stack component is thereby aligned.

As a result of the method presented, positioning deviations from electrochemical cell to electrochemical cell or from bipolar plate to bipolar plate can be kept small. For example, the first adjustment opening can be designed as a rotationally symmetrical hole and the second adjustment opening can be designed as a slot, which is aligned in the direction of the rotationally symmetrical hole.

The first adjustment device can thus be designed for example as a circular pin, which cooperates with the first adjustment opening so that the first stack component is positioned as precisely as possible. By means of the second adjustment opening in the form of a slot, the respective stack component can then be aligned around this fixed position through rotation. Therefore, by means of this method, tolerances in the dimensions of the stack components can also be compensated and precise mutual adjustment of the stack components can still take place.

According to one aspect, it is proposed that, for assembly of the first and/or the second stack component, the respective adjustment device and the respective adjustment opening are dimensioned with a first clearance fit.

According to one aspect, it is proposed that, for assembly of the first and/or the second stack component, there is a second clearance fit between the respective adjustment device and the respective adjustment opening of a plurality of stack components of the electrochemical substack below the first stack component, and the first clearance fit is dimensioned to be tighter than the second clearance fit.

In particular, as a result of a small first clearance fit, it can be achieved that particularly good adjustment of the stack components relative to one another is realized when assembling the stack components. This applies in particular for stack components situated one below another, which, at one point or in one position of the first or second adjustment device, cooperate with the first or second adjustment opening of the respective stack components in each case.

According to one aspect, it is proposed that, for adjustment purposes, the first and/or the second adjustment device are positioned via a positioning device and/or via the respective adjustment openings of a plurality of stack components of the electrochemical substack which are assembled one above another. Such a positioning device can be provided for example by a base plate, in which the first and/or the second adjustment device is positioned when the electrochemical sub stack has a small height at the start of the assembly of the stack components. When the height of the electrochemical substack increases, the first and/or the second adjustment device can be designed to cooperate with only some of the stack components of the electrochemical sub stack, so the respective adjustment device is positioned through the first or second adjustment opening in the respective stack components.

It is thus achieved that the respective adjustment device adjusts the newly assembled stack component in a certain upper region of the electrochemical substack in each case and the respective adjustment device can be repositioned, or it can be removed from the electrochemical sub stack, in the construction direction of the electrochemical sub stack without adversely affecting other stack components which are located further down in the substack.

In this case, the first and/or the second adjustment device can have a first region, in which the respective adjustment device cooperates with the respective adjustment opening via the first clearance fit in order to achieve an adjustment of the stack components in this region. The length of this first region of the adjustment device can be selected such that, for stack components which are arranged further down in the stack, friction between the stack components together with their weight due to gravity is enough to ensure that, for all stack components which are located further down, additional fixing of the alignment or adjustment is not required. In the corresponding second region of the first and/or the second adjustment device, the clearance fit between the first and/or the second adjustment device and the corresponding adjustment openings of the stack components can have larger dimensions so that, after the assembly of the electrochemical cell stack has been completed, the first and/or the second adjustment device can be removed, in particular in the construction direction of the electrochemical cell stack, without adversely affecting stack components. In other words, this means that the first and/or the second adjustment device are designed to only cooperate with the corresponding adjustment openings via an appropriately tight clearance fit in the first region of the first and/or the second adjustment device so that an adjustment of the stack components can take place.

According to one aspect, it is proposed that the first and/or second adjustment device are removed from the electrochemical substack in the construction direction of the electrochemical substack after the assembly of the first or the second stack component.

As a result of the first and/or second adjustment device being designed to be removable from the electrochemical substack in the construction direction, none of the stack components which are located further down are adversely affected as a result of removing the adjustment device, since the respective adjustment device is designed to cooperate with only some of the stack components of the electrochemical substack for the purpose of local adjustment.

According to one aspect, it is proposed that the first and/or the second adjustment device is repositioned in the assembly direction of the substack after a plurality of assemblies of a plurality of stack components have been realized. Such a plurality of assemblies can comprise for example a small number of assemblies, such as for example one, two or three assemblies; the plurality of assemblies can also comprise 10 assemblies or an even greater number in order to optimize the assembly of the stack component. For example, the repositioning may take place only when a subcomponent consists of an assembly comprising a number of different stack components.

According to one aspect, it is proposed that the first and the second stack component are different types. Since, with this method, the respective stack components of the electrochemical cell stack can be adjusted locally with respect to one another in a particularly precise manner, the stack components may not only be individual electrochemical cells, but also subunits of the electrochemical cells, for example a membrane-electrode unit or a bipolar plate. In other words, it is not necessary to connect subunits of the electrochemical cells to one another in advance before they are assembled to form a cell stack.

An electrochemical cell stack is proposed, whereof the stack components have been assembled according to one of the methods described above.

In terms of its construction, an electrochemical cell stack, for example a fuel cell stack, which is assembled in this way has particularly little variation owing to the local adjustment and, as a result of the precise adjustment by means of this method, the whole electrochemical cell stack is assembled in a precisely aligned manner and therefore requires less installation space.

A device for assembling a stack component on an electrochemical substack is proposed, wherein the stack component has a first adjustment opening and a second adjustment opening. In this case, the device has a base plate for constructing the electrochemical substack, a first adjustment device and a second adjustment device, wherein the first and the second adjustment device are arranged in two positions on the base plate to cooperate with corresponding adjustment opening of the stack component for assembly purposes. In this case, the first adjustment device and the second adjustment device are designed to be repositioned in the construction direction of the electrochemical substack in order to adjust the stack component on the electrochemical substack.

As a result of the first and/or the second adjustment device being designed to be repositioned, the device for assembling a stack component can receive successive stack components without the quality of the adjustment via the adjustment devices being impaired due to the increasing height of the electrochemical substack. With a device which is designed in this way, the first and/or the second adjustment device can cooperate with the corresponding adjustment openings so that, in particular, a local adjustment of the mutual alignment of the stack components takes place during the assembly of the stack components.

In this case, such a first and/or second adjustment device can be elongated and designed to penetrate through the electrochemical substack of stack components at the adjustment openings. At a bottom end of the respective adjustment device, a device which repositions the adjustment device can be provided.

The material of the respective adjustment device can be a metal, in particular a high-grade steel or a plastic, for example PEEK or Teflon.

For reliable adjustment, the front end of the respective adjustment device can have a form for receiving the respective stack components, for example a conical, a parabolic, a pointed cone-shaped, a semi-circular or even an oval form. This advantageously enables the front end of the adjustment device to assume the function of a fitting aid or adjustment aid by means of a large lead-in chamfer at this front or upper end.

As a result of each of the stack components having a first and a second adjustment opening, which, for adjustment purposes, cooperates with a first and second adjustment device of the device for assembling a stack component, the first adjustment opening can cooperate with the first adjustment device in order to position a stack component, and the second adjustment opening can be designed to cooperate with a second adjustment device so that the stack component is thereby aligned. As a result of the method presented, positioning deviations from electrochemical cell to electrochemical cell or from bipolar plate to bipolar plate can be kept small in that the first adjustment opening is designed as a rotationally symmetrical hole and the second adjustment opening is designed as a slot which is aligned in the direction of the rotationally symmetrical hole, as already described above for the method.

The first adjustment device can be designed for example as a circular pin, which cooperates with the first rotationally symmetrical adjustment opening so that the first stack component is positioned as precisely as possible. By means of the second adjustment opening in the form of a slot, the respective stack component can then be aligned around this fixed position through rotation. In this case, the second adjustment device can be rotationally symmetrical or it can have a form which is adapted to the slot. Therefore, by means of this method, tolerances in the dimensions of the stack components can also be compensated and precise adjustment of the stack components relative to one another can still take place.

According to one aspect, it is proposed that the first adjustment opening and the second adjustment opening of both the first stack component and a plurality of upper stack components of the electrochemical substack cooperate with the first and/or second adjustment device via a first clearance fit in order to locally adjust the stack component on the electrochemical substack. Furthermore, the first adjustment device and the second adjustment device cooperate with the first adjustment opening and the second adjustment opening of other stack components of the electrochemical substack via a second clearance fit, wherein the first clearance fit is dimensioned to be tighter than the second clearance fit.

In particular, as a result of a small first clearance fit, it can be achieved that particularly good adjustment of the stack components relative to one another can be achieved when assembling the stack components. This applies in particular for stack components situated one below another, which, at one point or in one position of the first or second adjustment device, cooperate with the first or second adjustment opening of the respective stack components in each case.

In other words, the respective adjustment device can have a taper below an adjustment region so that the first clearance fit between the respective adjustment device and the corresponding adjustment opening is only in effect in the adjustment region and the second clearance fit between the respective adjustment device and the corresponding adjustment opening is present in the lower tapered region. As a result, a local adjustment of the respective stack components takes place only within the adjustment region and, owing to the taper in the lower region of the adjustment device, the adjustment device can be removed from the electrochemical cell stack without adversely affecting stack components after completed assembly of the electrochemical cell stack. By way of example, such an adjustment device can have a diameter of 8 mm in the adjustment region and a diameter of 6 mm in the lower region.

According to one aspect, it is proposed that the first and/or the second adjustment device is designed to be removed from the electrochemical substack in the construction direction of the electrochemical substack.

This can be achieved in particular in that the first and/or the second adjustment device, in a first region—the adjustment region—in which it cooperates with the first or the second adjustment opening for assembling stack components for the purpose of local adjustment, for example via a corresponding clearance fit, has a larger diameter than in a second region of the respective adjustment device, which leads through the respective adjustment openings of underlying stack components of the electrochemical sub stack.

It can thus be achieved that, when removing the respective adjustment device, the underlying stack components of the electrochemical sub stack are not damaged as the respective adjustment device is removed.

According to one aspect, it is proposed that the first and/or the second adjustment device is designed to be repositioned in the construction direction of the electrochemical substack by means of an electrically driven drive device.

As a result of the electric drive of the respective adjustment device, the assembly of the stack components on the respective electrochemical substack can be automated.

According to one aspect, it is proposed that the device has a total adjustment device, which is arranged outside the electrochemical sub stack for assembly of the first and/or the second stack component.

As already explained above, as a result of the total adjustment device, which is arranged outside the electrochemical substack, a stable alignment of the whole electrochemical substack can be achieved since there are no restrictions regarding the dimensions of such a total adjustment device outside the electrochemical substack. The stack components can therefore be adjusted locally in each case by the first and the second adjustment device and the whole electrochemical substack can be adjusted and aligned by the total adjustment device.

The use of the device for constructing an electrochemical substack, as presented above, is proposed. Using the above-described device for assembling a stack component on an electrochemical substack has the same advantages as those described for the method and for the device.

In addition, it should be pointed out that "comprising" does not exclude other elements and "a" does not exclude a plural number. Furthermore, it should be pointed out that features which have been described with reference to one of the above exemplary embodiments can also be applied in combination with other features of other exemplary embodiments described above. Reference signs in the claims should not be regarded as restrictive.

BRIEF DESCRIPTION OF THE DRAWINGS

Exemplary embodiments of the invention are illustrated and explained in more detail with reference to the drawing figures and serve for better understanding of the invention.

DETAILED DESCRIPTION

In the figures, identical or similar components are denoted by identical or similar reference signs, with repeated description of these components being omitted in individual cases.

Figure 1:
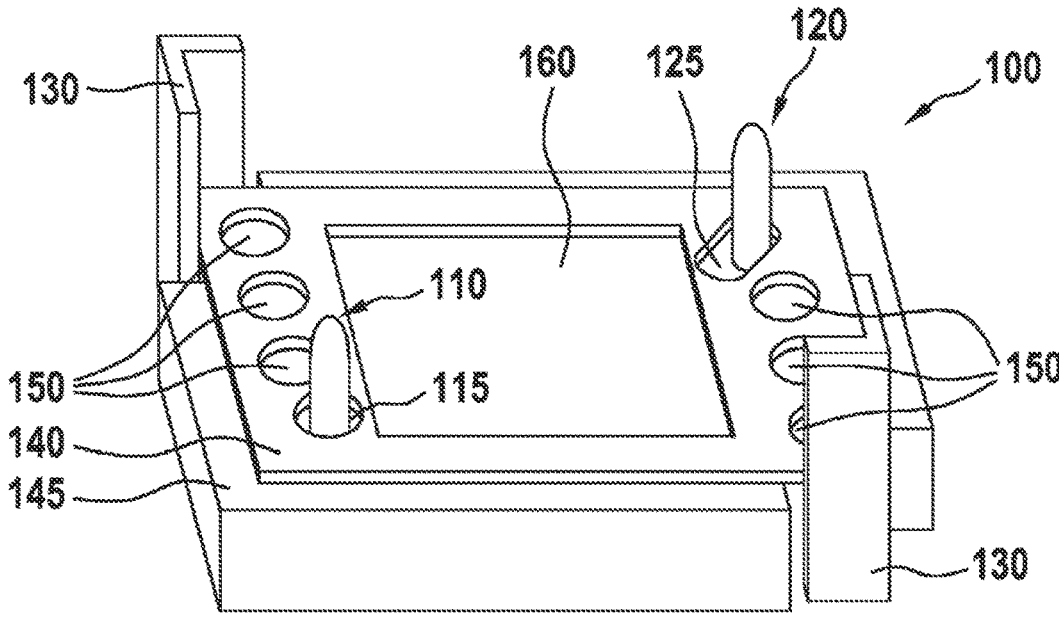
FIG. 1 shows a sketch of a device for assembling a stack component of an electrochemical substack.

FIG. 1 shows a schematic representation of the device 100 for assembling a stack component 140 on an electrochemical substack, wherein the stack component 140 has a first adjustment opening 115 and a second adjustment opening 125. The electrochemical substack is stacked on a base plate 145 for constructing the electrochemical substack and a stack component 140 can be adjusted by means of a first adjustment device 110 and a second adjustment device 120 as it is assembled on the electrochemical substack. In this case, the first adjustment device 110 and the second adjustment device 120 are arranged in two positions on the base plate 145 to cooperate with corresponding adjustment openings 115, 125 of the stack components 140 during assembly for the purpose of local adjustment. In this case, the first adjustment device 110 and the second adjustment device 120 are designed to be repositioned in the construction direction of the electrochemical substack in order to adjust the stack component 140 on the electrochemical substack.

In this case, the first adjustment opening 115 and the second adjustment opening 125 of both the first and the second stack component 140 and a plurality of upper stack components of the electrochemical substack cooperate with the first and/or second adjustment device 110, 120 via a first clearance fit in order to locally adjust the stack component 140 on the electrochemical sub stack.

The first adjustment device 110 and the second adjustment device 120 cooperate with the first adjustment opening 115 and the second adjustment opening 125 of other stack components 140 of the electrochemical substack—which are situated below the first stack component 140—via a second clearance fit. In this case, the first clearance fit is dimensioned to be tighter than the second clearance fit. In other words, the first and/or second adjustment device 110, 120 has two regions with a different diameter, wherein the respective adjustment device 110, 120 has a larger diameter at its upper end 111—the adjustment region—as seen in the construction direction than in a lower part 112, so that only the upper part 111 of the respective adjustment device 110, 120 cooperates locally with the respective adjustment openings 115, 125 in order to adjust the corresponding stack components 140.

Figure 2:
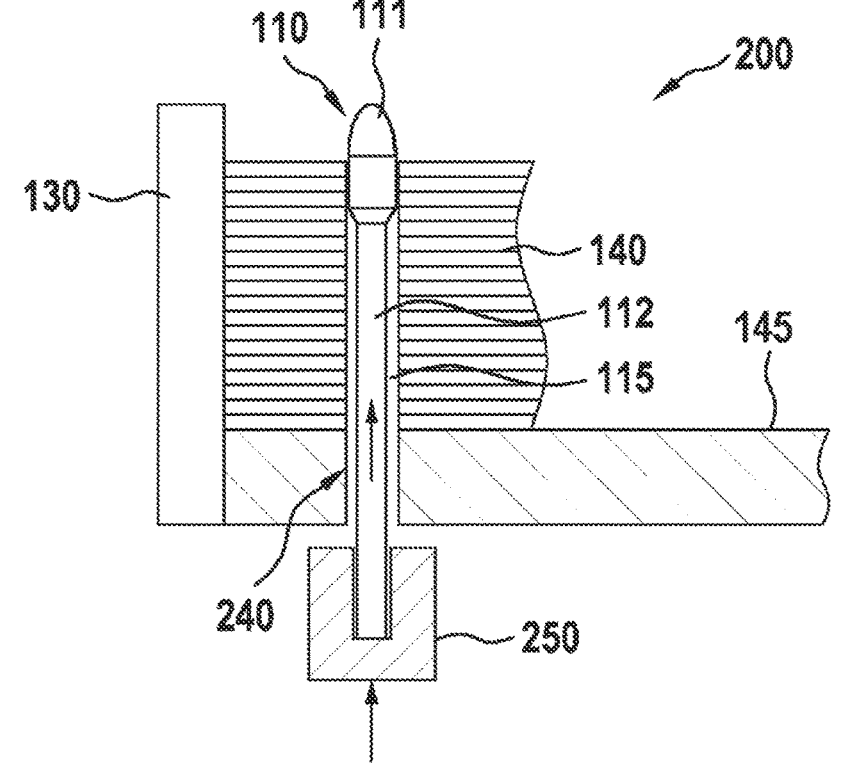
FIG. 2 shows a sketch of a cross section through a device for assembling a stack component of an electrochemical substack.

In FIG. 2, a cross section 200 through the device 100 for assembling a stack component 140 is shown schematically for an adjustment device 110, 120 according to FIG. 1. In this case, in addition to the elements of the device 100 which are explained above, the positioning device 240 inside the base plate 145 of the device 100, 200 can also be seen, which positioning device has a suitable fit between its internal diameter and the external diameter of the wider part 111 of the respective adjustment device 110, 120, so that the adjustment device 110 is positioned in a position in which the wider part 111 of the adjustment device 110 is in engagement with the opening of the positioning device 240. It can be seen that the adjustment device 110 only cooperates with a number of stack components, which are arranged in the upper part of the electrochemical substack, in order to adjust these locally, and the second part 112 of the adjustment device 110 has a smaller diameter so that the clearance fit in this region 112 is loose enough to prevent effective local adjustment of the stack components 140 from taking place.

It can furthermore be seen how the first adjustment device 110 can be designed to be repositioned in the construction direction of the electrochemical substack in that, for example, an electrically driven drive device moves the coupling element 250 in the indicated direction of the arrow. It can furthermore be seen how the coupling element 250 is designed to cooperate with part of the adjustment device 110 so that the adjustment device 110 can be removed from the electrochemical substack in the construction direction of the electrochemical substack in that it is mechanically removed from the coupling device 250 in the construction direction.

What is claimed is:

1. A method for assembling an electrochemical cell stack, the method having the steps:

assembling a first stack component (140), which has a first adjustment opening (115), on an electrochemical substack through cooperation between the first adjustment opening (115) and a first adjustment device (110) defining a longitudinal axis that extends in a longitudinal direction; and repositioning the first adjustment device (110) in the longitudinal direction for locally adjusted assembly of a second stack component (140), which has a corresponding first adjustment opening (115) for locally adjusted assembly, wherein the first and the second stack component (140) are assembled with aid of a total adjustment device (130), the total adjustment device (130) engages and aligns an outer perimeter of the first and the second stack components (140), while the first adjustment device (110) locally adjusts the first and the second stack component (140), wherein the first adjustment device (110) only engages stack components of a plurality of stack components that are arranged in an upper part of the electrochemical substack for locally adjusted assembly, and does not engage stack components of the plurality of stack components that are arranged in a lower part of the electrochemical substack.

2. The method as claimed in claim 1, wherein, for adjustment purposes, the first (110) and/or the second adjustment device (120) are positioned via a positioning device (240) and/or via the respective adjustment openings (115, 125) of the plurality of stack components of the electrochemical substack which are assembled one above another.

3. The method as claimed in claim 1, wherein the first (110) and/or the second adjustment device (120) are removed from the electrochemical substack in the longitudinal direction after the assembly of the first (140) or the second stack component.

4. The method as claimed in claim 1, wherein the first adjustment device (110) defines a first diameter adjacent the first stack component (140), wherein the first adjustment device (110) defines a second diameter adjacent the second stack component (140), and wherein the second diameter is greater than the first diameter.

5. The method as claimed in claim 1, wherein the outer perimeter includes a corner of the first and the second stack component (140).

6. The method as claimed in claim 1, wherein the first stack component (140) and the second stack component each have a corresponding second adjustment opening (125) and are assembled on the electrochemical substack in a locally adjusted manner with aid of a second adjustment device (120), wherein the second adjustment device (120) is repositioned in the longitudinal direction for assembly of the second stack component.

7. The method as claimed in claim 6, wherein, during assembly, the first and/or the second stack component (140) is positioned via the corresponding first adjustment opening (115) and is aligned via the corresponding second adjustment opening (125).

8. The method as claimed in claim 6, wherein, for assembly of the second stack component (140), the respective adjustment device (110, 120) and the respective adjustment opening (115, 125) are dimensioned with a first clearance fit.

9. The method as claimed in claim 8, wherein, for assembly of the first stack component (140), there is a second clearance fit between the respective adjustment device (110, 120) and the respective adjustment opening (115, 125) of the plurality of stack components of the electrochemical substack below the second stack component (140), and the first clearance fit is dimensioned to be tighter than the second clearance fit.

* * * * *